(12) United States Patent
Matt et al.

(10) Patent No.: US 8,446,131 B2
(45) Date of Patent: May 21, 2013

(54) METHOD AND DEVICE FOR REGULATING A POLYPHASE ROTATING ELECTRICAL MACHINE OPERATING AS A GENERATOR, AND POLYPHASE ROTATING ELECTRICAL MACHINE USING THEM

(75) Inventors: Jean-Claude Matt, Dijon (FR); Christophe Louise, Alforville (FR)

(73) Assignee: Valeo Equipements Electriques Moteur, Creteil (FR)

( * ) Notice: Subject to any disclaimer, the term of this patent is extended or adjusted under 35 U.S.C. 154(b) by 588 days.

(21) Appl. No.: 12/443,201

(22) PCT Filed: Sep. 26, 2007

(86) PCT No.: PCT/FR2007/052009
§ 371 (c)(1),
(2), (4) Date: Aug. 11, 2010

(87) PCT Pub. No.: WO2008/065286
PCT Pub. Date: Jun. 5, 2008

(65) Prior Publication Data
US 2010/0295516 A1   Nov. 25, 2010

(30) Foreign Application Priority Data
Nov. 28, 2006   (FR) .................................... 06 55163

(51) Int. Cl.
*H02J 7/14*   (2006.01)
*G05F 5/00*   (2006.01)

(52) U.S. Cl.
USPC .............................. 322/44; 322/28; 323/300

(58) Field of Classification Search
USPC ................... 322/27, 28, 37, 44, 59; 323/300, 323/98; 363/65
See application file for complete search history.

(56) References Cited

U.S. PATENT DOCUMENTS

| | | | |
|---|---|---|---|
| 5,006,781 A * | 4/1991 | Schultz et al. | 322/25 |
| 5,317,248 A | 5/1994 | Utley et al. | |
| 6,222,349 B1 * | 4/2001 | LeRow et al. | 322/34 |
| 7,019,506 B2 * | 3/2006 | Kernahan | 323/284 |
| 7,092,265 B2 * | 8/2006 | Kernahan | 363/65 |
| 7,095,220 B2 * | 8/2006 | Kernahan | 323/300 |
| 2004/0108840 A1 | 6/2004 | Morrissette | |
| 2005/0218815 A1 | 10/2005 | Kobayashi et al. | |

FOREIGN PATENT DOCUMENTS

| EP | 0 802 606 A1 | 10/1997 |
|---|---|---|
| EP | 0 849 855 A1 | 6/1998 |

* cited by examiner

*Primary Examiner* — Nicholas Ponomarenko
(74) *Attorney, Agent, or Firm* — Berenato & White, LLC

(57) ABSTRACT

The regulating method is employed in a polyphase rotating electrical machine operating as a generator and having an excitation coil (10). The method is of the type in which a DC voltage (B+) is slaved to a predetermined setpoint, the voltage being produced by rectifying an AC voltage generated by the machine by controlling the duty cycle of a periodic excitation current (+EXC,−EXC) by means of a microcontroller (11), or the like, as a function of sampled values of the DC voltage (B+). The duty cycle is determined by the microcontroller (11) twice during an excitation current cycle (+EXC, −EXC).

13 Claims, 3 Drawing Sheets

METHOD AND DEVICE FOR REGULATING A POLYPHASE ROTATING ELECTRICAL MACHINE OPERATING AS A GENERATOR, AND POLYPHASE ROTATING ELECTRICAL MACHINE USING THEM

CROSS-REFERENCE TO RELATED APPLICATIONS AND CLAIM TO PRIORITY

This application relates to International Application No. PCT/FR2007/052009 filed Sep. 26, 2007 and French Patent Application No. 0655163 filed Nov. 28, 2006, of which the disclosures are incorporated herein by reference and to which priority is claimed.

TECHNICAL DOMAIN OF THE INVENTION

The present invention concerns a method and a device for regulating a polyphase rotating electrical machine, especially of the alternator or alternator-starter type, comprising an excitation coil and operating as a generator. The invention also concerns a rotating electrical machine utilising this method and this device.

TECHNOLOGICAL BACKGROUND TO THE INVENTION

With a view to reducing energy consumption, it is now becoming common to stop the thermal engine of a vehicle when it comes to a halt, and to restart the engine motor to move off again, in a way which is automatic and totally transparent for the driver.

This is possible due to the development of alternator-starters, which have been rendered highly efficient by the use of electronic power systems controlled by circuits which rely on digital techniques, mainly based on the use of microprocessors or microcontrollers.

One example of such techniques is provided in the document U.S. Pat. No. 5,317,248, which describes the generation by a microcontroller system of the PWM switching pulses of the phase currents of a brushless electric motor.

The microcontroller utilised comprises both a central processing unit and programmable delay circuits enabling waveform synthesis, known as PWM (Pulse Width Modulation), of the switching signals.

Another example of application of digital techniques is given in the document US20040108840, which describes the voltage regulation of an alternator, or generator, by means of a microcontroller driving the duty cycle of the periodic excitation current of the machine on the basis of sampled values of the DC voltage generated.

The response time of this regulator to a load variation seems to be several seconds, or even tens of seconds.

As modern vehicles use ever more numerous and sophisticated electrical equipment, it is highly desirable for the device for adjusting the onboard power supply to a load variation to have a much lower response time, in order to avoid the phenomenon of "hunting" and vibrations.

When an alternator or a reversible machine is regulated by a digital system (microcontroller, microprocessor or programmable logic), the principle of regulation introduces a phase delay in the servo-control system linked to the cycle time and to the calculation delay.

So if T is the cycle time and Tc the calculation delay defined by the time which separates the quantity to be controlled (in particular the battery voltage, but also the excitation current, for example).

The phase delay $\theta(f)$ in degrees at a frequency f is expressed approximately by the expression:

$$\theta(f) = (T/2 + Tc) * f * 360°$$

In a traditional digital regulator, the control cycle time T is equal to the excitation period Te. The regulation loop refreshes the value of the duty cycle once per excitation cycle. This delay in the regulation loop is thus strongly linked to the switching period of the power transistor, as the calculation delay can generally be defined at the design stage to stay as low as possible, and small with respect to Te/2.

There is consequently a practical limitation of the regulation bandwidth to about Fe/8 to Fe/10, where Fe is the excitation frequency 1/Te.

The excitation frequency is specifically selected as a function of the power dissipated by the transistor during the switching phases. This dissipated power leads to a rise in the temperature of the chip, which is itself limited by the maximum junction temperature permitted by the technology utilised. This frequency thus cannot be increased without giving rise to new temperature constraints on the switching component.

GENERAL DESCRIPTION OF THE INVENTION

The present invention is thus intended to improve the regulation bandwidth, without modifying the switching frequency of the excitation current.

Its precise purpose is a method of regulating a polyphase rotating electrical machine operating as a generator, comprising an excitation coil, of the type in which a DC voltage is slaved to a predetermined setpoint, said voltage being produced by rectifying an AC voltage generated by the machine by controlling the duty cycle of a periodic excitation current by means of a microcontroller, or the like, as a function of sampled values of this DC voltage.

According to the invention, the value of the duty cycle of the excitation current is determined by the microcontroller twice during a cycle of the excitation current.

According to one particular embodiment, the value of the duty cycle is determined at around the start of the cycle, and at around the middle of the cycle. Preferably, the value of the duty cycle is determined just before the start of the cycle, and just before the middle of the cycle.

This determination preferably comprises the calculation of a first and of a second switching time as a function respectively of a first and of a second value of the DC voltage sampled respectively at approximately the start and in the middle of the cycle.

Highly advantageously, the establishment of the excitation current then results from the equality between the first switching period and a first result of the decremental count of clock signals during a first half of the cycle, and the cutting of the excitation current results from the equality between the second switching period and a second result of the incremental count of the clock signals during a second half of the cycle.

Alternatively, the establishment of the excitation current results from the equality between the first switching period and a first result of the incremental count of clock signals during a first half of the cycle, and the cutting of the excitation current results from the equality between the second switching period and a second result of the incremental count of the clock signals during a second half of the cycle.

The invention also concerns a device for regulating a polyphase rotating electrical machine, operating as a genera tor and producing a DC voltage, adapted to implement the method described above, of the type comprising:

a microcontroller or the like;

an analogue-digital converter for acquisition of a sample of the DC voltage generated;

a PWM generator;

an amplifier for these pulses;

at least one transistor controlled by the amplified pulses controlling an excitation current of the machine.

In one preferred embodiment of the invention, the PWM pulse generator comprises, notably, a binary reversible counter, and a comparator between a counting register of said binary reversible counter, able to contain a count value, and a memory register of the microcontroller, able to contain a representative value of a duty cycle of the PWM pulses.

In this preferred embodiment, the regulating device comprises, yet more advantageously:

a first clock generating first clock pulses presenting a first period equal to an excitation period of the excitation current;

a second clock generating second clock pulses presenting a second period equal to the first period divided by twice a first number, preferably 16;

a trigger circuit which acts by interrupting the acquisition of a sample of the DC voltage after each sequence of second clock pulses equal in number to the first number;

a third clock generating third clock pulses presenting a third period equal to the first period divided by twice a second number, preferably 1024, and connected to the binary reversible counter counting these third clock pulses from 0 to the second number, then from the second number to 0.

In another preferred embodiment of the invention, the PWM generator alternatively comprises, notably, a binary counter, and a comparator between a count register of this binary counter, able to contain a count value, and a memory register of the microcontroller, able to contain a value representing a duty cycle of the PWM pulses.

In this other preferred embodiment, the regulating device comprises, even more advantageously:

a first clock generating first clock pulses presenting a first period equal to an excitation period of the excitation current;

a second clock generating second clock pulses presenting a second period equal to the first period divided by twice a first number, preferably 16;

a trigger circuit which acts by interrupting the acquisition of a sample of the DC voltage after each sequence of second clock pulses equal in number to the first number;

a third clock generating third clock pulses presenting a third period equal to the first period divided by twice a second number, preferably 1024, and connected to the binary counter counting these third clock pulses from 0 to the second number.

Preferably, in both embodiments, the device for regulating a polyphase rotating electrical machine operating as a generator according to the invention is distinguished from the state of the art in that it further comprises at least one memory containing at least one program implementing the previously described method of regulation.

The invention also concerns a polyphase rotating electrical machine operating as a generator comprising a regulation device presenting the characteristics specified above.

It goes without saying that the invention also concerns sequences of instructions executable by the microcontroller, or the like, of the device according to the invention implementing the method of regulation as described, and also the memory containing said sequences of executable instructions.

These few essential specifications will have made obvious to the person skilled in the art the advantages delivered by the method and the device for regulation according to the invention, in relation to the prior art.

Detailed specifications of the invention are provided in the description which follows, in conjunction with the attached drawings. It should be noted that these drawings are intended merely to illustrate the text of the description and do not in any way constitute a limitation of the scope of the invention.

DESCRIPTION OF PREFERRED EMBODIMENTS OF THE INVENTION

The method according to the invention thus essentially consists of increasing the apparent frequency of the regulation loop without modifying the chopping frequency of the excitation transistor in order not to increase the switching losses in the transistor, and hence the junction temperature of the component.

Figure 1A:
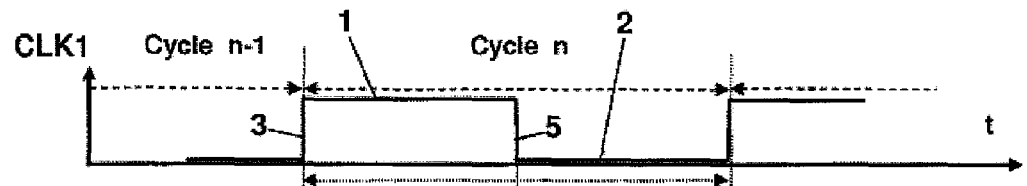
FIGS. 1a and 1b, 2a and 2b show timing diagrams of clock signals employed by the method and in the regulating device according to the invention.
Figure 1B:
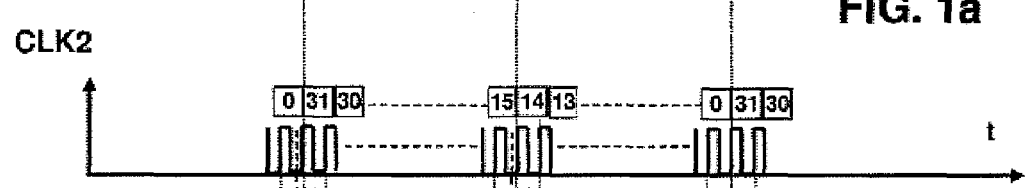
Figure 1C:
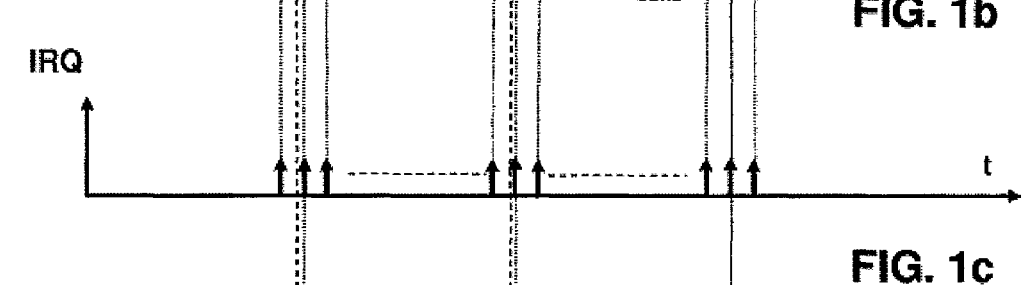
FIGS. 1c and 2c illustrate the triggering of the acquisition interruptions in relation to the clock signals from FIGS. 1b and 2b.
Figure 1D:
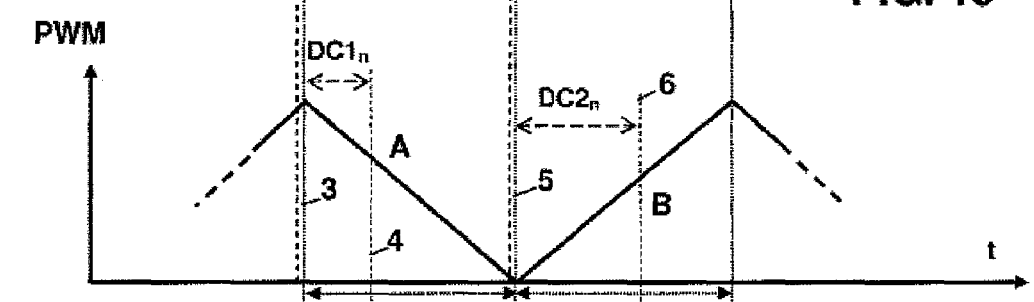
FIG. 1d shows the progress of the count by a reversible counter employed in a preferred embodiment of the invention, and illustrates the method of regulation according to the invention.
Figure 1E:
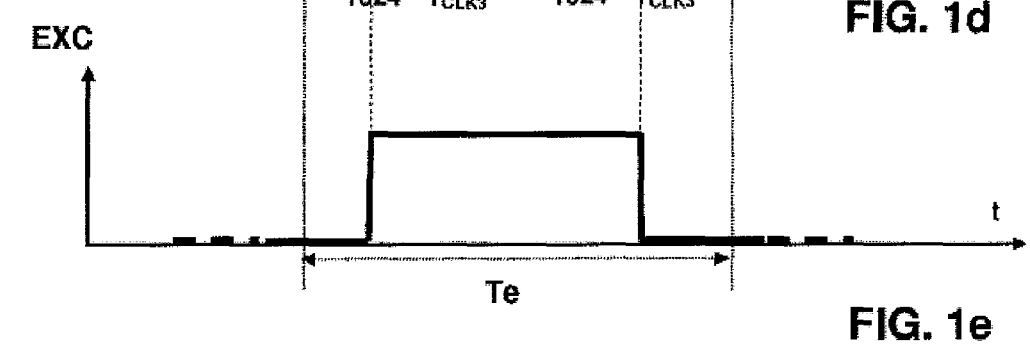
FIGS. 1e and 2e show timing diagrams of the PWM pulses resulting from the implementation of the method according to the invention.

FIG. 1a represents the first clock pulses CLK1 controlling the cycles of the regulation loop, the first period of which, T, is equal to the excitation period Te of the PWM control pulses EXC of the excitation current represented in FIG. 1e.

Fundamentally, according to the method of the invention, the first period T of the first clock pulses CLK1 is not reduced, hence nor is the excitation period Te, but the duty cycle is refreshed twice during a chopping period Te of the transistor.

In the first half of cycle 1, the regulator will decide on the basis of a first measurement of the quantity to be controlled at the instant the power transistor goes into the conductive state, and in the second half of cycle 2, and on the basis of a second measurement of the quantity to be controlled, this same regulation loop will decide the instant the transistor goes into the blocked state.

By doing this, the delay $\Phi(f)$ in degrees at the frequency $f=1/T$ becomes, as a function of a calculation delay Tc:

$$\Phi(f)=(T/4+Tc)*f*360°$$

The phase delay $\Phi(f)$ being thus reduced, in relation to the phase delay $\theta(f)$ penalising state of the art regulation devices as previously described, it is possible, while still respecting the same phase margin and gain margin rules, to significantly increase the regulation bandwidth.

This gain attains a factor 2 if the calculation delay Tc is small in relation to T. The benefit of this is an increased rapidity of servo control and better regulation performances.

FIGS. 1b, 1c and 1d illustrate in detail how the duty cycle of the excitation current is refreshed twice per regulation cycle according to a first preferred embodiment of the invention.

FIG. 1b shows the second clock pulses CLK2, having a second period TCKL2 which is 32 times smaller than the first period T. These second clock pulses thus define 32 time windows, numbered from 0 to 31, in the course of a cycle.

As shown in diagram form in FIG. 1c, an IRQ interrupt from the microcontroller, by means of which the regulation loop is implemented, is generated in each time window.

The time windows numbered 0 and 15, i.e. those preceding each of the half-cycles 1,2, are reserved respectively for the acquisition of first and second samples of the DC voltage to be regulated, and for the calculation, as a function of each of these samples and of a setpoint, of a quantity representing the duty cycle of the excitation current.

Before the start 3 of the cycle n, i.e. in time window 0, the microcontroller calculates a first switching period DC1$n$ between the start 3 of the cycle and a first switching time 4 of the transistor to the conductive state corresponding to the establishment of the excitation current.

Before the middle 5 of the cycle n, i.e. in time window 15, the microcontroller calculates a second switching period DC2$n$ between the middle 5 of the cycle and a second switching time 6 of the transistor to the blocked state corresponding to the chopping of the excitation current.

These switching periods DC1$n$, DC2$n$ are stored by the microcontroller, and compared to the count results of clock signals having a third period TCLK3 which is 2048 times smaller than the excitation period Te.

The clock signals are counted decrementally from 1024 to 0 during the first half 1 of the cycle, and incrementally in the second half 2 of the cycle, from 0 to 1024.

The change over time of the count results and of PWM decremental count is shown in FIG. 1d: it is similar to the triangular waveforms which are well known from analogue switching regulators.

When the result of the first (decremental) count is equal to the first switching period DC1$n$ (at point A), the excitation current is established, i.e. the EXC driving pulse of the control transistor is set to logic level 1, as shown by the timing diagram in FIG. 1e.

When the result of the second (incremental) count is equal to the second switching period DC2$n$ (at point B), the excitation current is cut, i.e. the EXC driving pulse of the control transistor is set to logic level 0.

Figure 2A:
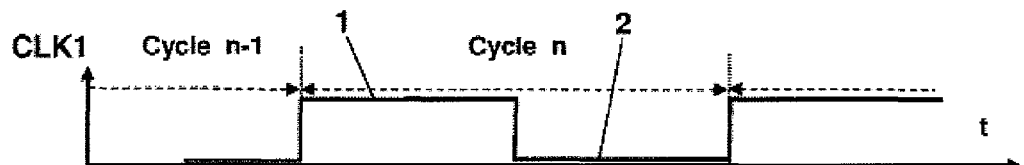
Figure 2B:
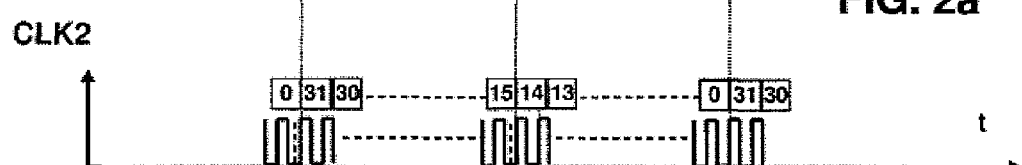
Figure 2C:
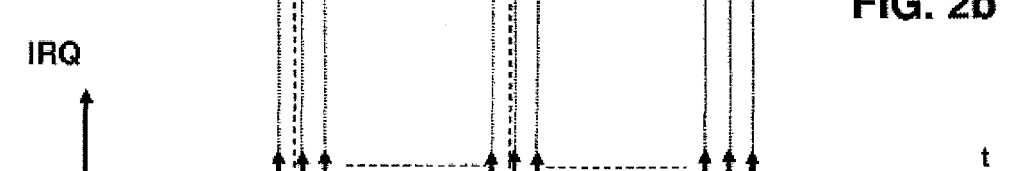
Figure 2D:
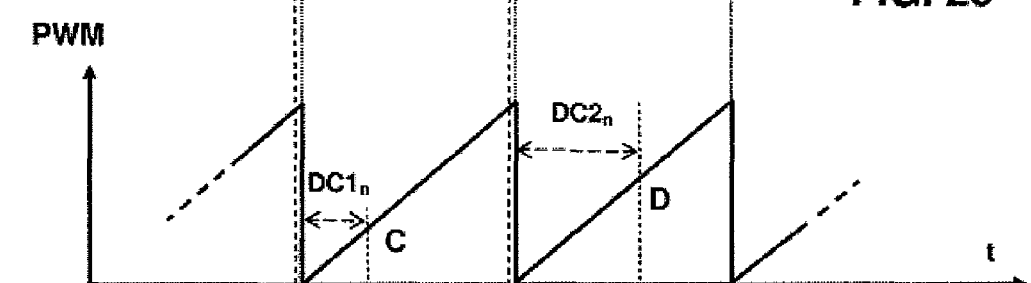
FIG. 2d shows the progress of the count by a counter employed in another preferred embodiment of the invention, and illustrates the method of regulation according to the invention.

A second way of refreshing the duty cycle of the excitation current twice per regulation cycle is shown in FIG. 2d.

In this second preferred embodiment of the invention, the switching periods DC1$n$, DC2$n$ calculated are compared, in the same way as in the first mode, to the count results of the clock signals having a third period TCLK3 which is 2048 times smaller than the excitation period Te.

But unlike the first mode, these clock signals are always counted incrementally in half-cycles 1,2.

The clock signals are counted incrementally from 0 to 1024 during the first half 1 of the cycle, and incrementally again in the second half 2 of the cycle, from 0 to 1024.

The change over time of the PWM count results is shown in FIG. 2d. It appears to be identical to the saw tooth waveforms which are well known from analogue switching regulators, but in reality, it is not: the period of the PWM saw tooth waveforms is not the period of the EXC PWM pulses intended to control the excitation current.

Figure 2E:
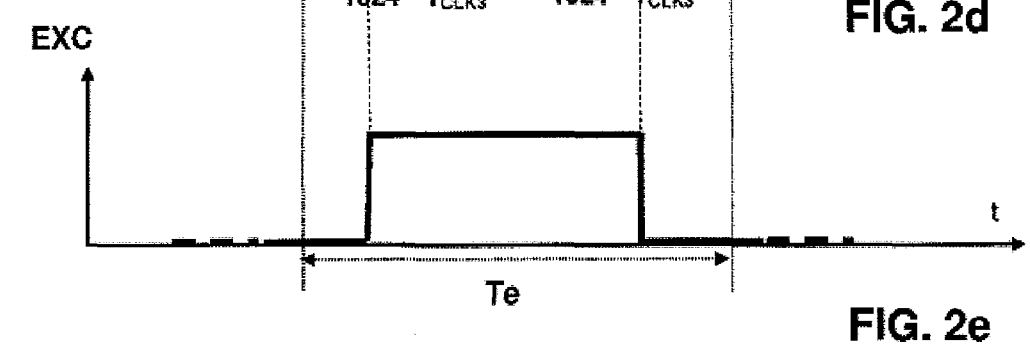

In fact, when the result of the first count in the course of the first half-cycle 1 is equal to the first switching period DC1 $n$ (at point C), the excitation current is determined, i.e. the EXC driving pulse of the control transistor is set to logic level 1, as shown by the timing diagram in FIG. 2e, and when the result of the second count in the course of the second half-cycle 2 is equal to the second switching period DC2$n$ (at point D), the excitation current is cut, i.e. the EXC driving pulse of the control transistor is set to logic level 0.

The EXC driving pulse thus only changes level once per half-cycle, i.e. its period Te is always the period T of the regulation cycle, and not the period of the PWM saw tooth waveforms.

In this second embodiment, the method according to the invention thus also makes it possible to reduce the phase delay $\Phi(f)$ by a factor of practically 2 without modifying the switching frequency.

This switching frequency is preferably between 100 Hz and 350 Hz.

The method of regulation according to the invention therefore offers a regulation bandwidth which would correspond to switching frequencies of between 200 Hz and 700 Hz, without requiring the implementation of a technology which can tolerate high operating temperatures (2000° C., or even higher), and/or cooling systems for the electronics, in particular by water, because of the high losses which arise at these frequencies.

Figure 3:
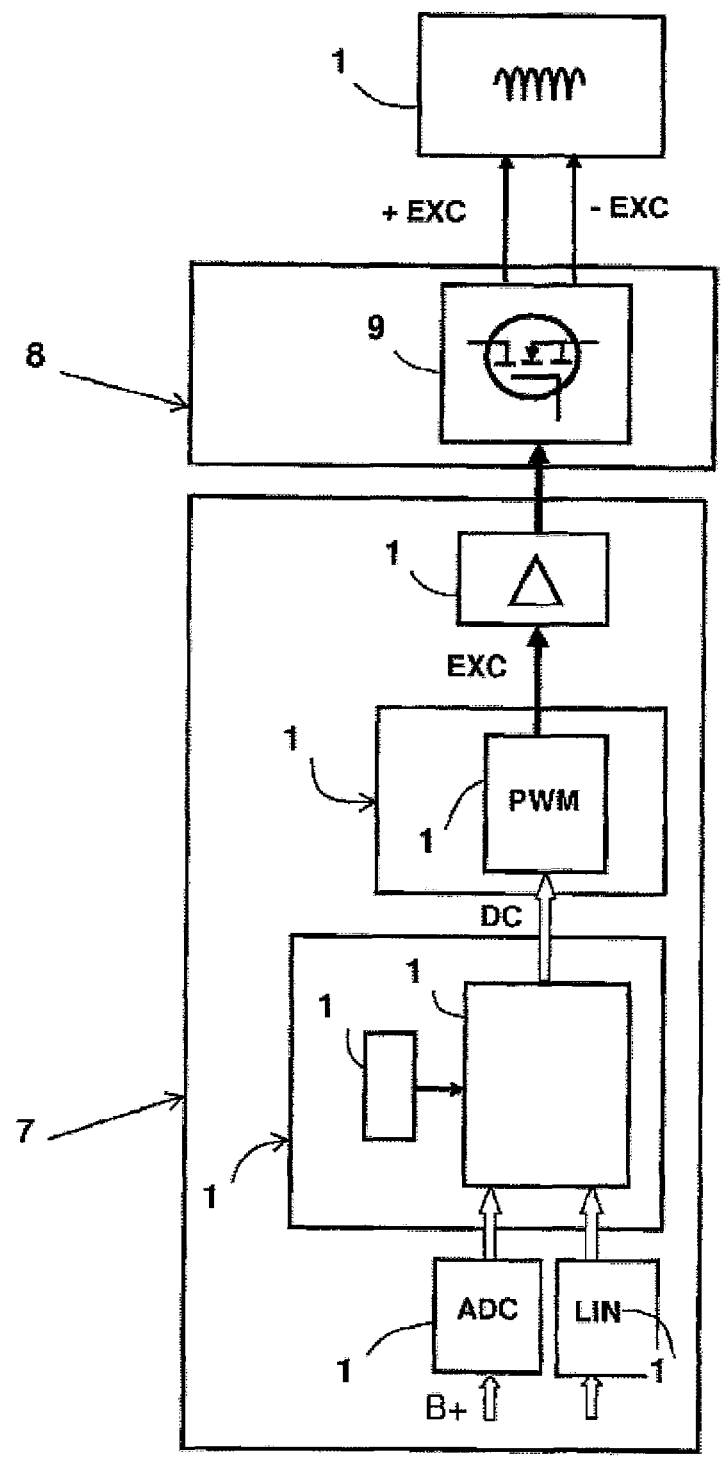
FIG. 3 is an overview diagram of a regulating device according to the invention.

As shown in the overview diagram in FIG. 3, the regulation device 7,8 adapted to the implementation of the method of regulation according to the invention to a rotating electrical machine operating as a generator, presents the advantage of being little different from existing devices.

This regulation device 7,8 essentially comprises two parts 7,8: a control circuit 7 constituted by an ASIC (application-specific integrated circuit), and a power electronic means 8 comprising MOSFET ([metal oxide semiconductor] isolated gate field effect transistors) type transistors 9 to control the excitation current +EXC,−EXC applied to the excitation coil 10.

The control ASIC 7 comprises in particular:
- a microcontroller 11 comprising a real-time clock system 12 and sequences of instructions 13 implementing the method according to the invention;
- an analogue-digital converter 14 intended to acquire samples of the DC voltage B+ generated by the machine;
- a PWM EXC pulse generator 15;
- an amplifier 16 of these EXC pulses controlling the transistors 9 of the power electronic means 8.

The setpoint of the regulation loop is preferably fixed via an interface circuit 17 with the onboard network conforming to LIN (local interconnection network) standard.

The real-time clocks system 12 supplies clock pulses CLK1, CLK2 of different periods T, TCLK2, TCLK3 utilised by the ASIC circuit 7, as well as the IRQ interrupt signals from the microcontroller 11.

In the first preferred embodiment of the invention, the EXC PWM pulse generator 15 specifically comprises a 10-bit binary reversible counter 18, of which the change in count value, contained in a count register, generates a double ramp which a comparator compares to the value of a DC switching period stored by the microcontroller 11 in a memory register.

In the second preferred embodiment of the invention, the EXC PWM pulse generator 15 alternatively comprises a 10-bit binary reversible counter 18 generating a single ramp. This method and this regulation device are preferably utilised in reversible rotating electrical machines, containing an excitation coil, when they operate as generators. With the aid of the regulation device 7, 8 according to the invention, an alternator-starter thus has its dynamic regulation significantly improved when it operates as an alternator, while nevertheless producing no increase in the power dissipated by switching in the power transistors 9, as the normal chopping frequency is retained.

It goes without saying that the invention is not limited solely to the preferred embodiments described above.

In particular, the types of electronic components cited are given only by way of examples. The use of any other type of components having the same functionalities would only constitute variant embodiments.

There are embodiments of the double refresh per regulation cycle of the duty cycle of the control pulses of the excitation current other than those developed above, but they have not been described. These other embodiments would not go beyond the scope of the present invention insofar as the characteristics of the method implemented, and of the corresponding device, result from the following claims.

The invention claimed is:

1. Method of regulating a polyphase rotating electrical machine operating as a generator, comprising an excitation coil (10), in which a DC voltage (B+) is slaved to a predetermined setpoint, said voltage being produced by rectifying an AC voltage generated by said machine by controlling a duty cycle of a periodic excitation current (+EXC, −EXC) by means of a microcontroller (11), as a function of sampled values of said DC voltage (B+), wherein the value of said duty cycle is determined by said microcontroller (11) twice during a cycle of said excitation current (+EXC, −EXC).

2. Method of regulating a polyphase rotating electrical machine operating as a generator according to claim 1, wherein said determination is carried out at approximately the start (3) of said cycle, and approximately in the middle (5) of said cycle.

3. Method of regulating a polyphase rotating electrical machine operating as a generator according to claim 2, wherein said determination comprises the calculation of a first and a second switching period (DC1$n$, DC2$n$) as a function respectively of a first and a second value of said DC voltage, sampled respectively at approximately the start (3) and approximately in the middle (5) of said cycle.

4. Method of regulating a polyphase rotating electrical machine operating as a generator according to claim 3, wherein the determination of said excitation current (+EXC, −EXC) results from the equality between said first switching period (DC1$n$) and a first result of the decremental count of clock signals during a first half (1) of said cycle, and the chopping of said excitation current (+EXC, −EXC) results from the equality between said second switching period (DC2$n$) and a second result of the incremental count of said clock signals during a second half (2) of said cycle.

5. Method of regulating a polyphase rotating electrical machine operating as a generator according to claim 3, wherein the determination of said excitation current (+EXC, −EXC) results from the equality between said first switching period (DC1$n$) and a first result of the incremental count of clock signals during a first half (1) of said cycle, and the chopping of said excitation current (+EXC, −EXC) results from the equality between said second switching period (DC2$n$) and a second result of the incremental count of said clock signals during a second half (2) of said cycle.

6. Device (7,8) for regulating a polyphase rotating electrical machine operating as a generator and producing a DC voltage (B+), adapted to the implementation of the method according to claim 1, comprising:
   a microcontroller (11) or the like;
   an analogue-digital converter (14) for acquiring a sample of said DC voltage (B+);
   a PWM (EXC) pulse generator (15);
   an amplifier (16) for said PWM (EXC) pulses;
   at least one transistor (9) controlled by said amplified PWM (EXC) pulses controlling an excitation current (+EXC,−EXC) of said machine;
   wherein said generator (15) comprises a binary reversible counter (18), and a comparator between a count register of said binary reversible counter (18) able to contain a count value and a memory register of said microcontroller (11) able to contain a value representing a duty cycle of said PWM (EXC) pulses.

7. Device (7,8) for regulating a polyphase rotating electrical machine operating as a generator according to claim 6, wherein it also comprises:
   a first clock (12) generating first clock pulses (CLK1) presenting a first period (T) equal to an excitation period (Te) of said excitation current (+EXC, −EXC);
   a second clock (12) generating second clock pulses (CLK2) presenting a second period (TCKL2) equal to said first period (T) divided by twice a first number, preferably 16;
   an (IRQ) trigger circuit (12) which acts by interrupting said acquisition after each sequence of said second clock pulses (CKL2) equal in number to said first number;
   a third clock (12) generating third clock pulses presenting a third period (TCKL3) equal to said first period (T) divided by twice a second number, preferably 1024, and connected to said binary reversible counter (18) counting said third clock pulses from 0 to said second number, then from said second number to 0.

8. Device (7,8) for regulating a polyphase rotating electrical machine operating as a generator and producing a DC voltage (B+), adapted to the implementation of the method according to claim 1, comprising:
   a microcontroller (11) or the like;
   an analogue-digital converter (14) for acquiring a sample of said DC voltage (B+);
   a PWM (EXC) pulse generator (15);
   an amplifier (16) for said PWM (EXC) pulses;
   at least one transistor (9) controlled by said amplified PWM (EXC) pulses controlling an excitation current (+EXC,−EXC) of said machine;
   wherein said generator (15) comprises a binary counter (18), and a comparator between a count register of said binary counter (18) able to contain a count value and a memory register of said microcontroller (11) able to contain a value representing a duty cycle of said PWM (EXC) pulses.

9. Device (7,8) for regulating a polyphase rotating electrical machine operating as a generator according to claim 8, further comprising:
   a first clock (12) generating first clock pulses (CLK1) presenting a first period (T) equal to an excitation period (Te) of said excitation current (+EXC, −EXC);
   a second clock (12) generating second clock pulses (CLK2) presenting a second period (TCKL2) equal to said first period (T) divided by twice a first number, preferably 16;
   an (IRQ) trigger circuit (12) which acts by interrupting said acquisition after each sequence of said second clock pulses (CKL2) equal in number to said first number;
   a third clock (12) generating third clock pulses presenting a third period (TCKL3) equal to said first period (T) divided by twice a second number, preferably 1024, and connected to said binary counter (18) counting said third clock pulses from 0 to said second number.

10. Device (7,8) for regulating a polyphase rotating electrical machine operating as a generator according to claim 6, further comprising at least one memory containing at least one program (13) implementing the method according to any of the preceding claims 1 to 5.

11. Polyphase rotating electrical machine operating as a generator comprising a device for regulation (7,8) according to claim 6.

12. Sequences of instructions (13) executable by said microcontroller (11), according to claim 6 implementing a method of regulating a polyphase rotating electrical machine operating as a generator, comprising an excitation coil (10), in which a DC voltage (B+) is slaved to a predetermined setpoint, said voltage being produced by rectifying an AC voltage generated by said machine by controlling a duty cycle of a periodic excitation current (+EXC, −EXC) by means of a microcontroller (11), as a function of sampled values of said DC voltage (B+), wherein the value of said duty cycle is determined by said microcontroller (11) twice during a cycle of said excitation current (+EXC, −EXC).

13. Memory containing sequences of instructions (13) executable by said microcontroller (11), according to claim 6 implementing a method of regulating a polyphase rotating electrical machine operating as a generator, comprising an excitation coil (10), in which a DC voltage (B+) is slaved to a predetermined setpoint, said voltage being produced by rectifying an AC voltage generated by said machine by controlling a duty cycle of a periodic excitation current (+EXC, −EXC) by means of a microcontroller (11), as a function of sampled values of said DC voltage (B+), wherein the value of said duty cycle is determined by said microcontroller (11) twice during a cycle of said excitation current (+EXC, −EXC).

* * * * *